W. L. NYE.
Machine for Stringing Tags.

No. 165,173.  Patented July 6, 1875.

WITNESSES:  W. L. Nye.
F. A. Faber  F. Curtis, Atty.
W. E. Boardman

UNITED STATES PATENT OFFICE.

WILLIAM L. NYE, OF BOSTON, MASSACHUSETTS.

IMPROVEMENT IN MACHINES FOR STRINGING TAGS.

Specification forming part of Letters Patent No. 165,173, dated July 6, 1875; application filed April 26, 1875.

*To all whom it may concern:*

Be it known that I, WILLIAM L. NYE, of Boston, Suffolk county, Massachusetts, have invented certain Improvements in Machinery for Stringing Tags, of which the following is a specification:

This invention consists, principally, in the employment of a tubular rod or sheath, arranged within or above a narrow trough or chute, (or, in place of such trough, an adjustable plate,) and serving to support upon its exterior a large number of tags, which are suspended from it in a close pack, the cord with which each tag is strung as it is taken up or consumed passing or being fed through the bore of the rod from a ball or spool properly placed; the tubular guide and the trough, which receives and in part guides the tags and maintains them in an upright position, being preferably arranged in a sloping position, in order that such tags may tend to descend the tube by their own gravity into a position to be readily singled out and detached, one by one, by the attendant, while the bottom of the trough, or a plate representing such bottom, is adjustable, in order that it may be adapted or adjusted to tags of various lengths, as it is desirable that the entire pack, or a greater part thereof, shall rest upon this bottom or plate, and relieve the tubular sheath of their weight, as, owing to the attenuated diameter of this rod, which the size of the eye of the tag through which it passes renders imperative, it can of necessity possess but little strength or rigidity. The lower or inner end of the bottom of the trough, or the plate employed independently of the trough, terminates in a short reverse slope or ascent, to keep back the pack of tags, and prevent their detaching themselves from the tubular rod, and I combine with the rod and the trough or plate a mechanism for closing a piece of sheet metal about the doubled cord, or otherwise securing the cord to the tag, and a knife for severing such doubled or attached cord from the main portion issuing from the tube, the whole being as hereinafter stated.

Figure 1:
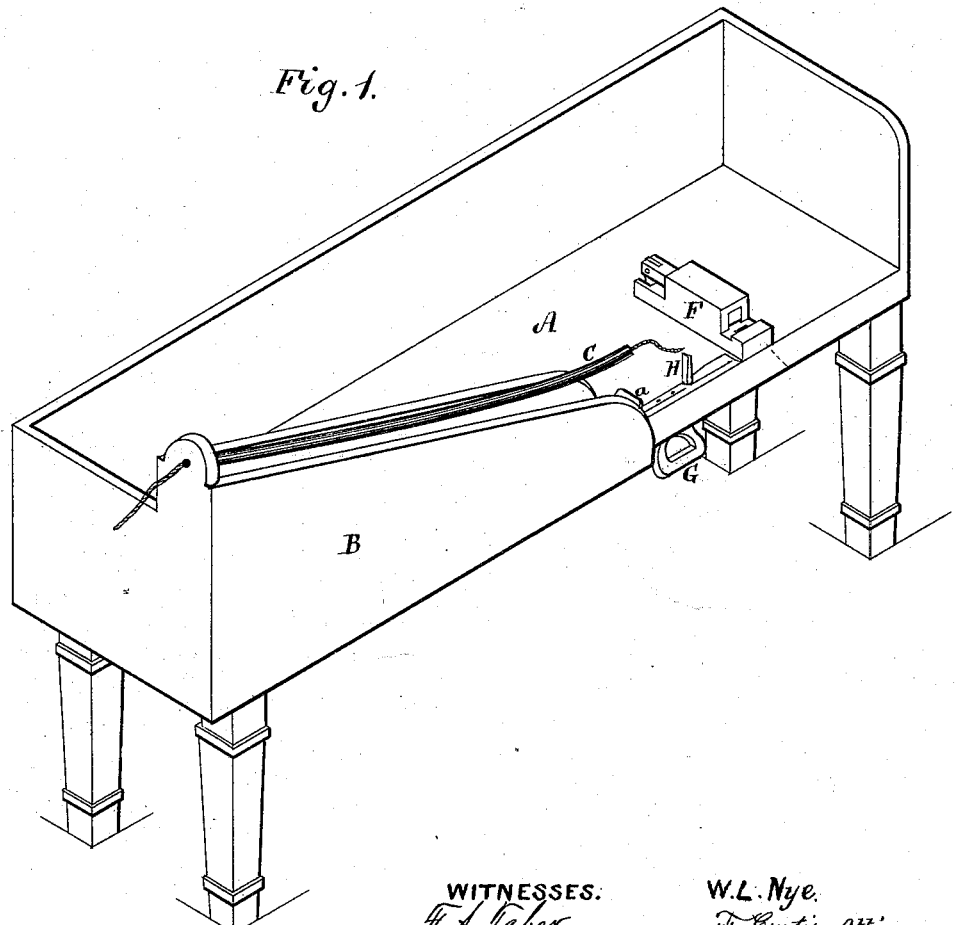
Figure 2:
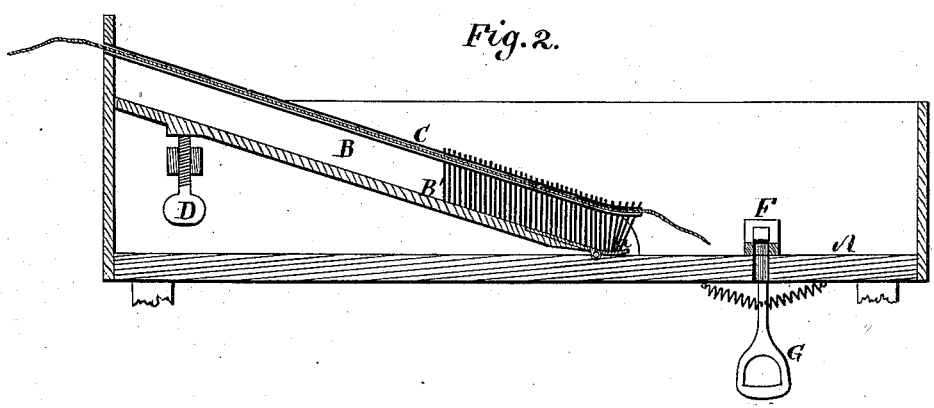

The drawings accompanying this specification represent, in Figure 1, a perspective view, and in Fig. 2 a longitudinal and vertical section, of a machine embodying my invention.

In these drawings, A represents a bench or table, upon the front edge of which, and for convenience the left side thereof, I erect a trough or chute, B, of a width sufficient to admit the passage of the size of tags to which any particular machine is adapted. Within or at the upper part of the trough B I dispose a tube or sheath, C, which extends the entire length of the trough, and projects a short distance beyond the inner end of the latter for convenience in removing the tags. The bottom B' of the trough B is adjustable, and its outer end is elevated or depressed by a set-screw, D, placed below it, the purpose of this being to adapt the trough to tags of various lengths; and in some instances it may be well to construct the trough in such manner that its width may be adjustable or changeable, to adapt one and the same machine to extreme variations in sizes of tags. The trough B, as well as the tube C, is placed, preferably, in a sloping position, as shown in the drawings, in order that, as a tag is removed, those remaining shall descend, or be more readily compelled to descend, the tube, into a convenient position to be seized by the operator; while, to prevent accidental escape of the tags from the tube, and yet allow them to be readily removed by such operator, I terminate the bottom of the trough or guide in a short reverse slope or incline, *a*. A short distance in front of the inner end of the tube C I add to the table or bench A a machine, (shown at F,) the purpose of this machine, which is actuated by a treadle, G, being to fold about the double cord a small strip of metal, and confine the cord to the tag.

As neither this clasp-folding machine, in itself considered, or the work produced by it, embraces anything of my invention, I shall not refer to its construction, or explain such construction, in this specification, my object in adding it to the drawings being to impart to the reader a clear idea of the operation of my invention. In fact, this clasp-folding machine may be substituted by another which shall secure the cord to the tag by tying a knot in the former, or otherwise securing the two together, as I do not in this respect confine myself to the use, in combination with the points original with myself, of any particular machine for attaching the cord to the tag.

At some point intermediate between the inner end of the tube C and the clasp-folding machine F I dispose upon the table A an upright knife, H, by which the portion of the cord which has been folded and attached to the tag is severed from the bulk within the tube. The ball of cord, which is fed or supplied through the bore of the tube C, is to be placed in a cage at the head of such tube, or otherwise disposed in any convenient locality. The attendant with her right hand seizes and detaches the first tag of the pack, and, folding the end of the cord which protrudes from the tube, doubles it about the tag, and introduces the fold within the machine F, which folds or clasps the metal strip about the doubled cord near to the tag, and by this means confines such cord to the tag.

The clasp-folding machine F and the knife H are placed at such a distance asunder that while the clasp is being confined to the cord, as stated, the knife is in the position to sever the cord at the proper point to leave the ends of the desired length, and the attendant, after the clasp has been added, severs the cord by drawing it against the edge of the knife, which completes the operation.

Under some circumstances it may result that the walls of the trough or guide B may be dispensed with, the important feature in this respect being the adjustable bottom or plate B', for, while it is desirable to retain the said walls as guides to the tags, to maintain the latter in an upright position, it would be possible to operate without them.

The adjustable bottom or adjustable plate, or its equivalent, representing such bottom, is, however, an indispensable element in the machine, when the tube C is of such length as to be unable to support the weight of the tags which may be strung upon it.

The advantage I gain in this invention is mainly great economy of time, as with it my employés are enabled to earn high wages, and I am enabled to furnish the tags strung at comparatively low prices.

I claim—

1. In machinery for stringing tags, the combination, with a tubular tag-carrying and cord-conducting sheath or rod, of a plate arranged beneath said sheath, upon which the tags in passing along the sheath may rest, substantially as described.

2. The combination of the tubular tag-carrying and cord-conducting sheath and the tag guide or trough, provided with a bottom adjustable toward and from said sheath, substantially as set forth.

3. A machine for stringing tags, comprising the following elements in combination, namely: a tag-carrying and string-conducting tube, a tag supporting or guiding plate or trough, a clasp-folding mechanism, and a knife intermediate between said mechanism and the said sheath, substantially as described.

WM. L. NYE.

Witnesses:
W. E. BOARDMAN,
F. CURTIS.